Figure 1:
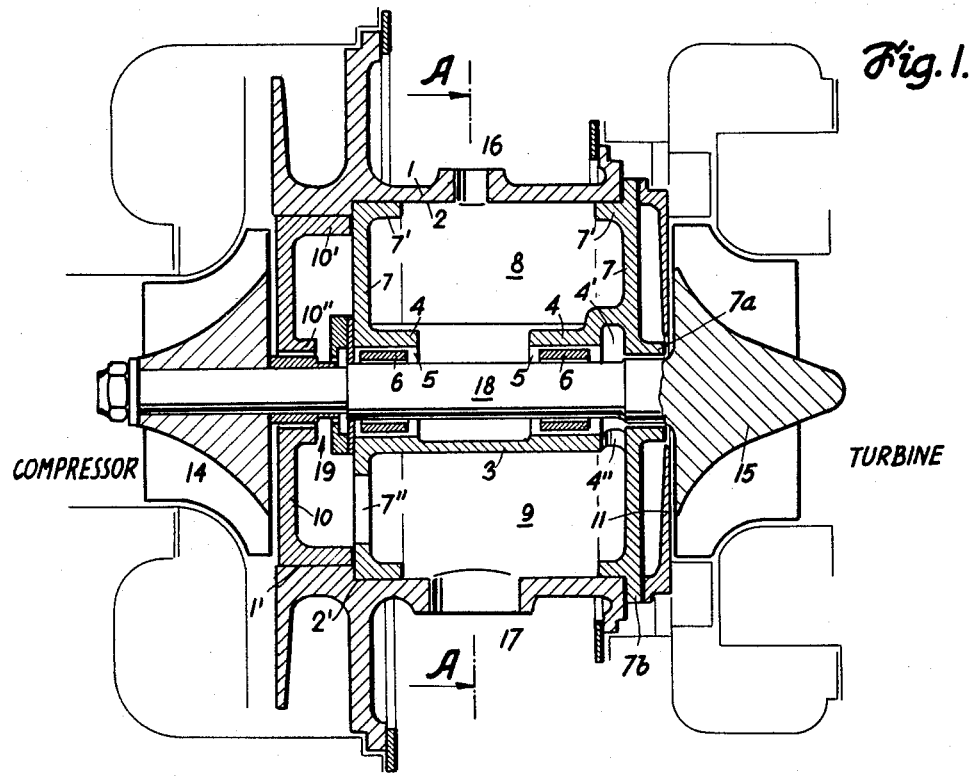

United States Patent Office 3,394,875
Patented July 30, 1968

3,394,875
BEARING ARRANGEMENT FOR A TURBINE-COMPRESSOR UNIT
Jan Haša, Josef Arnošt, and Miroslav Pavlík, Brno, Czechoslovakia, assignors to Prvni Brnenska Strojirna, zavody Klementa Gottwalda, narodni podnik, Brno, Czechoslovakia
Filed Oct. 10, 1966, Ser. No. 586,321
Claims priority, application Czechoslovakia, Oct. 11, 1965, 6,137/65
10 Claims. (Cl. 230—116)

The present invention relates to a bearing arrangement for a turbine-compressor unit having a pair of wheels respectively mounted on opposite ends of a shaft. Such units are, for example, used with turbine blowers for supercharging of diesel engines. In such arrangements the temperature of the working fluid of the turbine is usually considerably higher than that which is necessary to insure safe operation of the bearings. To keep the temperature of the bearings at an adequate level, the bearings are usually protected by thermal shields, insulating intermediate spaces, by cooling the bearings with a suitable fluid and/or by a combination of the above-mentioned features.

In a bearing arrangement presently widely in use the bearings and the whole bearing housing are cooled by means of lubricating material passing therethrough in order to maintain the bearing arrangement at an adequate temperature and for this purpose the bearing housing is provided with a partition so that two compartments are formed into one of which lubricating material is fed under pressure and in the other of which the lubricating material is collected and discharged from the bearing housing. The lubricating material, such as oil or the like, flows from the pressure space formed by one of the compartments through the bearings into the collecting space formed by the other of the compartments and is discharged from the latter so as to cool by heat exchange all parts of the bearing arrangement with which it comes in contact. If the amount of lubricating material passing axially through the bearings of the arrangement is not sufficient for such a heat exchange, the pressure space is usually connected by means of a calibrated overflow opening with the collecting space.

In bearing arrangements of the aforementioned kind and presently in use, the aforementioned partition is integrally cast with the remainder of the bearing housing. This known design has several disadvantages. The interior of the pressure space from which the lubricating material flows into the bearings mounted in the bearing housing can be cleaned only with difficulties, and since the bearing housing with its partition is sandcast, sand particles clinging to the inner surfaces of the wall portions forming the pressure space will be released during operation of the bearing and cause damage of the bearings proper. In addition, in this known design the flow of the lubricating material through the bearing arrangement is not directed in such a manner to provide for a uniform contact with the walls forming the bearing arrangement and consequently the heat exchange in the pressure and collecting chambers is uneven and thermal deformation of the housing may occur. Furthermore, the assembly of the rotor of the turbine-compressor unit with the bearing housing is in the known arrangement a very intricate job which requires disassembly of the rotor unit.

It is an object of the present invention to overcome the disadvantage of bearing arrangements of the aforementioned kind.

It is a further object of the present invention to provide for a bearing arrangement for a turbine and compressor unit in which the bearing arrangement will be properly and uniformly cooled during operation by the lubricating material flowing therethrough.

It is an additional object of the present invention to provide a bearing arrangement for the above purpose which is constructed of few and relatively simple parts which can be manufactured at reasonable cost and which can be assembled and disassembled with the turbine and compressor unit in an efficient manner.

With these objects in view, the bearing arrangement according to the present invention for a turbine-compressor unit having a pair of wheels respectively mounted on opposite ends of a shaft mainly comprises a bearing housing having opposite open ends and being located between the wheels about the shaft and having an inner peripheral surface extending about the shaft radially spaced therefrom, insert means located in the housing between the pair of wheels and comprising a pair of end walls spaced in direction of the axis of the shaft from each other and being substantially normal to the shaft axis and having each an outer peripheral surface in tight engagement with the inner peripheral surface of the housing, a pair of projecting portions respectively projecting toward each other from the pair of end walls and each being formed with a cylindrical bore therethrough coaxial with the shaft and through which the shaft extends with clearance, and a partition wall extending between said end walls below the cylindrical bores transversely through the housing and dividing the space in the housing between the end walls in an upper compartment and a lower compartment, the partition wall having opposite edge faces slightly spaced from the inner surface of the housing so as to form between each edge face and the inner surface a gap permitting flow of lubricating material from said upper into said lower compartment, bearing means in the cylindrical bore of each projection, inlet passage means communicating with the upper compartment for feeding lubricating material under pressure thereinto, and discharge passage means for discharging lubricating material from the lower compartment.

Preferably the insert means includes a pair of wings extending between the end walls and respectively upwardly from opposite sides of the partition wall with the outer surfaces of the wings respectively forming continuation of the edge faces of the partition wall so that the outer surfaces of each wing define with the opposite portion of the inner surface of the housing a gap of uniform width.

Since the bearing arrangement according to the present invention includes separate castings for the bearing housing and the insert means constructed in such a manner that the inner surfaces of the castings are accessible without difficulties, any molding sand clinging to these surfaces after sand casting may be easily and completely removed therefrom. Thus the danger of damage caused to the bearings which are very sensitive to impurities is diminished. The bearing housing and insert means castings according to the present invention are substantially simpler than the bearing housing castings of known design and the castings for the bearing arrangement according to the present invention may be manufactured in an exceedingly simple manner so that the danger of rejects is reduced. Since the bearing housing and the partition means are separate castings, it is also possible to use different materials for the two castings, for example, the housing may be made from normal cast steel, and alloy steel may be used for casting the insert means. The flow of lubricating material through the bearing housing may be adjusted in advance by properly dimensioning the aforementioned gaps between the wings of the insert means and the inner surface of the bearing housing in relation to the flow of lubricating material which can pass in axial direction through the bearings. The aforementioned gaps which extend longitudinally substantially over the whole length of the bearing housing will also assure such a flow of the lubricating material through the bearing housing which will provide a uniform heat distribution. The upwardly extended wings on the partition will form with the latter and the endwalls a vessel in which lubricating material is maintained during shutdown of the machine at which further supply of lubricating material to the bearing arrangement is cut off while the machine continues to rotate under its inertia. During this time the bearings are protected from damage by the lubricating material maintained in the aforementioned vessel, which during this time will still flow in axial direction through the bearings. The arrangement according to the present invention facilitates also assembly and disassembly in that if the diameter of the wheel on one end of the shaft is made slightly smaller than the minimum diameter of the bearing housing, the whole unit comprising the insert means, the shaft bearings therein, the shaft and the two wheels may be removed as a unit from the bearing housing.

Figure 2:
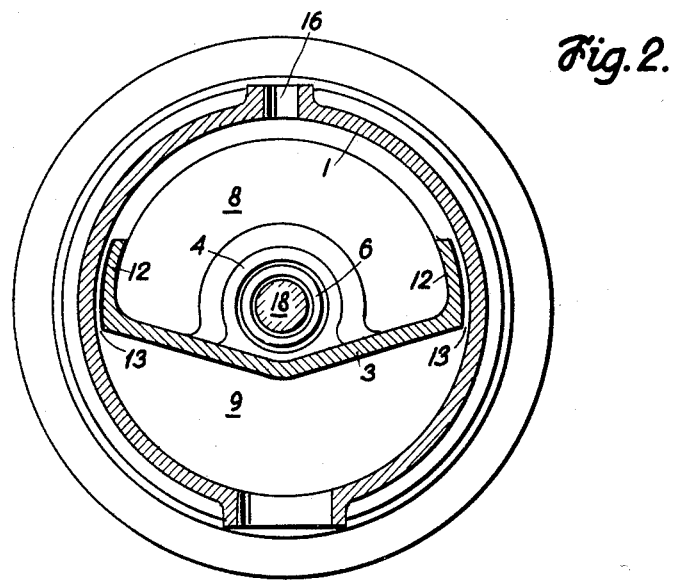

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic cross section through the bearing arrangement and showing also the rotor of the turbine-compressor unit; and FIG. 2 is a cross section taken along the line A—A of FIG. 1.

Referring now to the drawings, and more specifically to FIG. 1 of the same, it will be seen that the bearing arrangement according to the present invention mainly comprises a generally cylindrical bearing housing 1 having an inner preferably cylindrical surface 2, and the bearing housing 1 may be formed at one of its open ends, for instance at the left end, as viewed in FIG. 1, with an annular inwardly extending shoulder 1' having an inner diameter smaller than the remainder of the housing and forming a shoulder face 2' substantially normal to the axis of the housing. Located in the interior of the housing 1 are insert means comprising a pair of end walls 7 arranged axially spaced from each other and extending substantially normal to the axis of the bearing housing 1 and each having a peripheral annular flange 7' projecting toward the other of the pair of end wall means, and being at the outer peripheral surface thereof in tight contact with the inner surface 2 of the bearing housing 1. The insert means comprise further a pair of projecting portions 4 respectively projecting toward each other from the pair of end walls 7 and each being formed with a cylindrical bore 5 therethrough preferably coaxial with the cylindrical surface 2 of the bearing housing, and a partition wall 3 extending between the end walls 7 below the cylindrical bores 5 transversely through the housing and dividing the space in the housing between the end walls in an upper compartment 8 and a lower compartment 9. A pair of wings 12, as best shown in FIG. 2, extend between the end walls 7 and respectively upwardly from opposite sides of the partition wall 3 and the outer surfaces of these wings 12 are preferably cylindrical surfaces coaxial with the inner surface 2 of the outer housing 1, but having a slightly smaller diameter than the inner surface 2 so as to form between the inner surface 2 of the housing 1 and the outer surfaces of the wings 12 gaps 13 of uniform width. The housing 1 is formed in an upper portion thereof with an inlet opening 16 communicating with the compartment 8 through which lubricating material, such as oil or the like, may be fed in a known manner under pressure into the compartment 8. The lower wall portion of the housing is formed with an outlet opening 17 communicating with the compartment 9 from which lubricating material may be discharged. Bearings 6, only schematically shown in FIG. 1, are located in the cylindrical bores 5 of the projecting portions 4 to rotatably support the shaft 18 of the rotor of the turbine-compressor unit. The bearings 6 which may be needle bearings, or roller, or ball bearings are constructed in a known manner to permit flow of lubricating material in axial direction therethrough. The outer end of the bore 5 through the right projecting portion 4, as viewed in FIG. 1, communicates with an annular channel 4' formed therein, which annular channel 4' in turn communicates through an opening 4" with the compartment 9. The left end wall 7, as viewed in FIG. 1, abuts with an annular portion of its outer end face against the shoulder face 2', and the space between the inner end face of the compressor wheel 14 fixed to the left end, as viewed in FIG. 1, of the shaft 18, and the outer end face of the left end wall 7, its occupied by a cup-shaped member 10 having an annular flange 10', the outer peripheral surface of which is in tight engagement with the inner peripheral surface of the shoulder 1' and the right end face of which is in tight engagement with the outer face of the left end wall 7. The cup-shaped member 10 is provided with a central hub 10' through which the wall 18 extends. Spacer means 19 extending through the hub 10' between the inner end face of the wheel 14 and a shoulder on the shaft 18, respectively, the outer end face of the left end wall 7, as viewed in FIG. 1, are provided with openings, not shown in the drawing, to permit lubricating material passing through the left bearing 6 as viewed in FIG. 1, into the interior of the cup-shaped member 10, from where the lubricating material may flow through an opening 7" in the left end wall into the compartment 9. The right end wall, as viewed in FIG. 1, may have an outwardly projecting hub 7a through which an enlarged portion of the shaft 18 extends and proper seals, not shown in the drawing, may be provided between the inner surface of the hub 7a and the shaft portion extending therethrough. A cup-shaped shielding member 11 may be provided in the space between the outer end face of the right end wall 7, as viewed in FIG. 1, and the inner end face of the turbine wheel 15. The right end wall 7, as viewed in FIG. 1, has preferably also a radially outwardly extending annular flange 7b abutting against the right end face of the housing 1 and the annular flange 7b and a corresponding annular flange of the member 11 may be connected by bolts or the like to the housing 1. Proper sealing means are also preferably arranged between the inner surface of the hub 10' and the spacer means 19.

The various channels for guiding fluid about the compressor wheel 14 and the turbine wheel 15 are only partly and schematically shown in FIG. 1 and the housings defining these channels are releasably connected in a known manner to appropriate flanges of the bearing housing 1. As can be seen from FIG. 1 the diameter of the compressor wheel 14 is slightly smaller than the inner peripheral surface of the housing shoulder 1' so that the rotor of the turbine-compressor unit, that is the shaft 18 and the wheels 14 and 15 thereon may be removed together with the aforementioned insert means from the bearing housing 1 without requiring disassembly of the rotor.

It will be understood that each of the elements described above, or two or more together, may also find a useful application in other types of bearing arrangement for a turbine-compressor unit differing from the types described above.

While the invention has been illustrated and described as embodied in a bearing arrangement for a turbine-compressor unit having a pair of wheels respectively mounted on opposite ends of a shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics

What is claimed as new and desired to be secured by Letters Patent is:

1. A bearing arrangement for a turbine-compressor unit having a pair of wheels respectively mounted on opposite ends of a shaft, said bearing arrangement comprising a bearing housing having opposite open ends and being located between said wheels about said shaft, said housing having an inner peripheral surface extending about said shaft radially spaced therefrom; insert means located in said housing between said pair of wheels and comprising a pair of end walls spaced in direction of the axis of the shaft from each other and being substantially normal to the shaft axis and having each an outer peripheral surface in tight engagement with said inner peripheral surface of said housing, a pair of projecting portions respectively projecting towards each other from said pair of end walls and being formed respectively with cylindrical bores therethrough coaxial with said shaft and through which said shaft extends with clearance, and a partition wall extending between said end walls below said cylindrical bores transversely through said housing and dividing the space in said housing between said end walls in an upper compartment and a lower compartment, said partition wall having opposite edge faces slightly spaced from the inner surface of said housing so as to form between each edge face and said inner surface a gap permitting flow of lubricating material from said upper compartment into said lower compartment; bearing means in the cylindrical bore of each projecting portion and rotatably supporting said shaft; inlet passage means communicating with the upper compartment for feeding lubricating material thereinto and discharge passage means for discharging lubricating material from the lower compartment.

2. A bearing arrangement as defined in claim 1, wherein said bearing means are constructed and arranged in said bores to permit flow of lubricating material in axial direction from the inner to the outer ends thereof, and including passage means for providing communication between said outer ends and said lower compartment.

3. A bearing arrangement as defined in claim 2, and including a pair of wings extending between said end walls and respectively upwardly from opposite sides of said partition wall with the outer surfaces of said wings slightly spaced from said inner peripheral surface of said housing and forming said gaps therewith.

4. A bearing arrangement as defined in claim 3, wherein each gap between the outer surface of each wing and the opposite portion of said inner surface of said housing is of uniform width.

5. A bearing arrangement as defined in claim 2, wherein said inner surface of said housing and the outer surface of each end wall are cylindrical.

6. A bearing arrangement as defined in claim 5, wherein each of said end walls has a peripheral annular flange projecting towards the other of pair of end walls.

7. A bearing arrangement as defined in claim 2, wherein said housing has a radially inwardly extending annular shoulder in the region of one open end thereof defining an annular shoulder face, one of said end walls of said partition means abutting with its outer end face thereof against said shoulder face, said inner surface of said housing from said shoulder to the other open end thereof being cylindrical so that said insert means is withdrawable from said housing through the other open end thereof.

8. A bearing arrangement as defined in claim 7, and including a pair of wings extending between said end walls and respectively upwardly from opposite sides of the partition wall, the outer surface of each wing being concentric with the inner cylindrical surface of said housing and slightly spaced therefrom.

9. A bearing arrangement as defined in claim 8, wherein said shoulder has an inner cylindrical surface extending between said one open end of said housing and said shoulder face, and including a cup-shaped member having an annular flange with an outer peripheral surface tightly engaging said inner peripheral surface of said shoulder, and an end face abutting against the outer end face of said one end wall.

10. A bearing arrangement as defined in claim 9, wherein said inner peripheral surface of said shoulder has a diameter larger than that of the wheel at said one open end of said housing.

References Cited

UNITED STATES PATENTS 841,122    1/1907    Christensen _____ 308—245

EDGAR W. GEOGHEGAN, *Primary Examiner.*

F. SUSKO, *Assistant Examiner.*